Figure 7:
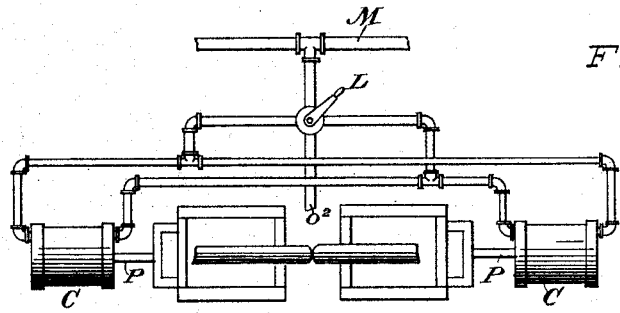

(No Model.) 2 Sheets—Sheet 1.
H. LEMP.
ELECTRIC WELDING APPARATUS.
No. 504,496. Patented Sept. 5, 1893.
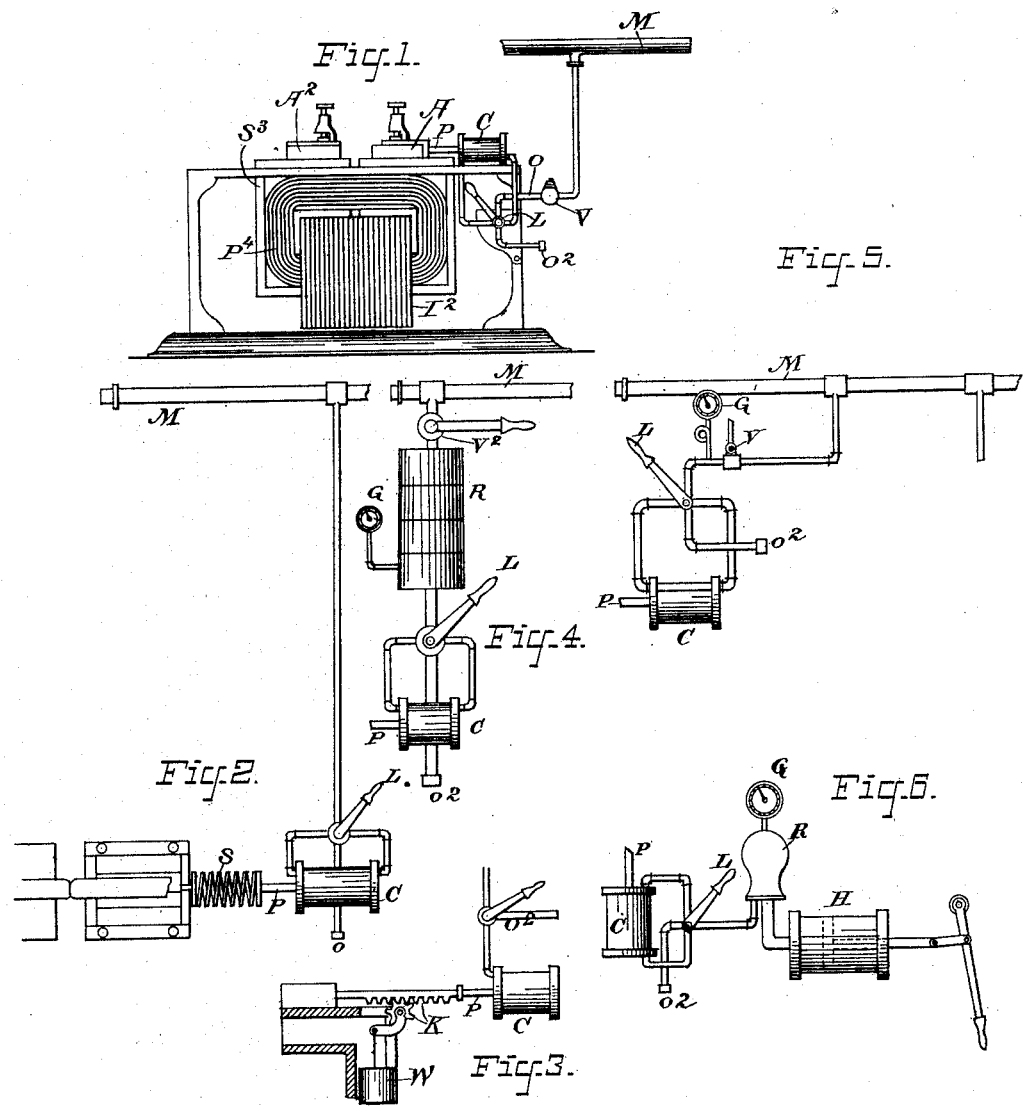
ATTEST:
J. A. Hurdle
Wm. H. Capel
INVENTOR:
Hermann Lemp.
By H. C. Townsend
Attorney (No Model.) 2 Sheets—Sheet 2.

H. LEMP.
ELECTRIC WELDING APPARATUS.

No. 504,496. Patented Sept. 5, 1893.

ATTEST:
J. A. Hurdle
John H. Capel

INVENTOR:
Hermann Lemp.

By H. C. Townsend
Attorney

UNITED STATES PATENT OFFICE.

HERMANN LEMP, OF LYNN, MASSACHUSETTS, ASSIGNOR TO THE THOMSON ELECTRIC WELDING COMPANY, OF MAINE.

ELECTRIC WELDING APPARATUS.

SPECIFICATION forming part of Letters Patent No. 504,496, dated September 5, 1893.

Application filed June 25, 1890. Serial No. 356,632. (No model.)

*To all whom it may concern:*

Be it known that I, HERMANN LEMP, a citizen of the United States, and a resident of Lynn, in the county of Essex and State of Massachusetts, have invented certain new and useful Electric Welding Apparatus, of which the following is a specification.

My invention relates to the construction of electric metal working apparatus in which the heating effect is produced by current of electricity. In such machines, it is customary to provide vises or clamps for securely and rigidly holding the metal or metals operated upon, and these vises are movable in the direction necessary to accomplish the welding or forging operation. It is not always advisable to make more than one of these movable, but in several operations it is both convenient and much better to provide arrangements for moving more than one. To produce good results it is necessary that these clamping devices should have a perfectly smooth and straight movement and also that there should be some method of reliably regulating the amount of pressure exerted, to accommodate different classes and sizes of work. Also in working the larger diameters of metal, the necessary pressure is too great to be supplied by hand power, and some easy, convenient, and sure method, without complicated apparatus, is needed to effect the operation. I prefer to use fluid pressure acting upon a piston, and such devices as will render the whole apparatus sufficiently simple as to require little skill in manipulation.

My invention consists essentially in the combination with an electric metal working apparatus, of means for operating the movable work holder or slide of the same through the pressure of air, gas, water or other fluid combined with suitable devices whereby the pressure applied to the sliding work holder may be regulated or adjusted according to the nature of the work.

In carrying out my invention the pressure of the air, gas or other fluid, may be used to directly impel the work holder or slide toward the opposite work holder while the work is heated to the desired degree in which case the means for regulating the pressure would be devices employed for indicating or regulating the pressure of air, gas or other fluid. In some cases, however, the pressure applied to the clamp or holder may be that of a spring or weight which is connected to the work holder and the action of which is overcome by the pressure of the air, gas or other fluid after which the spring or weight, regulated to apply the desired force, is allowed to act through the withdrawal of the air, gas or other fluid.

As will be obvious the two ways of carrying out my invention are essentially the same, the only difference being that in the latter arrangement the pressure of the air, gas or other fluid is stored in the spring or weight.

In the operation of electric metal working apparatus, in accordance with my invention, it is desirable to adjust the apparatus to a predetermined pressure and leave it to act when the material becomes sufficiently softened, this being the manner of operation ordinarily followed in electric welding and other electric metal working processes. In this operation the pressure is applied to bring the parts to be welded into contact and to hold them in contact while, after the softening of the same, the continuance of the pressure produces the desired movement.

In carrying out my invention I may use either gases or liquids. Gases are preferable with some metals especially with copper which is quick to melt during the operation, because the pressure will cause the metal to follow up at the melting portion more rapidly, thus keeping the pieces always in contact and preventing rupture of the circuit through the melting down of the material. In the case of iron where the metal becomes simply plastic, liquid pressures are satisfactory.

The value of my invention is especially noteworthy in the case of copper where a very slight variation in the area of the pieces to be welded requires a change in the pressure. Should too great a force be employed the metal will "squash up" while, if too little pressure is used, the metal will melt out and open the circuit or else the pieces will not be pressed into intimate connection.

By the employment of some means for regulating the pressure with which the clamp or holder actuated by the fluid pressure, shall be moved, I am enabled to satisfactorily employ air, gas, water or other fluid for operating directly upon the movable work holder and thereby securing the smooth straight movement of the work which is necessary to the satisfactory operation of the apparatus under all conditions.

Where a constant head or pressure of air, gas, or other fluid, can be maintained, an ordinary reducing valve which can be set or adjusted will serve the purposes of my invention. In other cases it may be desirable to employ a local reservoir connected with the source of supply and with the piston that moves the work holding clamp and provided with some means for indicating the pressure stored in such reservoir so that the pressure or force with which the holder shall be moved may be regulated or adjusted to different kinds of work.

In the accompanying drawings:—Figure 1, is a side view of an electric welding machine in connection with which is shown my invention. Figs. 2, 3, 4, 5, 6, 7, 8 and 9, are various methods of practicing my invention.

Referring to Fig. 1, A, indicates the work holder of an electric welding apparatus, substantially such as described in my Patent No. 428,618, dated May 27, 1890, and $A^2$, the opposite holder. These holders are mounted upon the ends of the secondary conductor $S^3$, as described in the patent mentioned. $P^4$, is the primary coil of the transformer and $I^2$, the laminated core therefor. The work holder A, is movable toward the opposite holder $A^2$, for the purpose of imparting pressure to the metals to be welded or otherwise worked at the point where they are heated between the holders. C, is a fluid pressure cylinder, the piston rod P, of which connects with the clamp or work holding slide as indicated in the drawings. Pressure of air, gas, steam or other fluid or liquid at the rear end of the piston will move the slide toward the opposite slide so as to force the pieces to be welded into contact and when they are heated to the desired extent to effect the weld as now well understood in the art. The pressure may be derived from any suitable source as from a main M, and the fluid of whatever kind may preferably be carried through a reducing valve V, which should be made adjustable for the purpose of determining the pressure which shall be imparted to the clamp slide. The movement of the clamp slide backward may be also produced by pressure at the opposite end of the piston, though other means might be employed for the purpose. L, is a four way valve controlled by a lever and of any suitable construction for permitting the fluid pressure to act on either side of the piston in the cylinder C. Suitable pipes connect from the valve to opposite ends of the piston and to the inlet pipe O, and the outlet pipe $O^2$. The outlet pipe $O^2$, serves to carry off the waste fluid or liquid which escapes from the cylinder C, when the lever is turned to proper position for producing a vent or exhaust from such end of the cylinder. Fluid pressure in the main M, may be kept constant by any means in which case the valve V, may be dispensed with and other means employed for adjusting the pressure which shall act on the piston. The fluid pressure may be stored as energy in a spring or a weight.

In Fig. 2, I have shown an arrangement whereby the energy may be stored in a spring. The spring is interposed between the piston P, and the clamp slide. The four way valve is used in connection with the apparatus as follows:—The valve is turned to allow pressure to operate upon the piston so as to compress the spring and move the clamp slide toward the opposite slide so as to bring the metals into contact. Pressure is then cut off the fluid remaining in the cylinder acting as a stop to hold the metals in contact. It will of course be understood that in this case it is desirable to employ a non-elastic fluid. When the abutting ends of the metal pieces to be welded soften by the passage of the electric current, the compressed spring forces them together and effects the weld. Instead of storing the pressure or energy in a spring it may be stored in a weight as indicated in Fig. 3. A weight is obviously preferable owing to the fact that its action will be uniform under all conditions. The weight may be an adjustable weight which may be readily regulated or changed to suit the pressure which it is desired to impart to the stock to be welded such pressure varying, as well understood, with different sizes of work. In this case the piston rod P, carries a rack K, which engages with a pinion on a rack shaft carrying a bent lever from which depends the weight W. In this case the cylinder C, is open at its rear end to the atmosphere. A three way valve may be employed in this case, the action of the valve being to admit pressure to the cylinder C, in a direction to raise the weight or to permit the liquid to escape from the cylinder through the outlet pipe $O^2$. In operating the apparatus the lever is turned to admit the pressure thus withdrawing the clamp slide and permitting the metal to be placed in position. The movement also raises the weight. The valve is now turned to open communication between the cylinder C, and the outlet pipe $O^2$, leaving the piston in the cylinder exposed only to atmospheric pressure and free to move under the influence of the weight W, which now falls forcing the clamp slide toward the opposite clamp and bringing the metals into contact with a pressure which on softening of the metals also effects the weld.

Fig. 4, illustrates an arrangement of apparatus which it is preferable to employ in case an elastic fluid as air under pressure or steam is used for giving the necessary pressure. In this instance R, is a receiver whose cubical contents are considerably larger than that of the cylinder C, and which is connected with a pressure main M, through a valve V². The four way valve or cock L, is arranged as in the case Fig. 1, to control the piston movement. G, is a pressure gage for indicating the pressure which it is desired or necessary to use in performing the operation. A slight initial pressure may be used in the cylinder C, for bringing the metals into contact after which the valve L, is turned to cut off the communication with the cylinder at both ends thereof and valve V², is opened while the receiver fills to the pressure indicated by the gage G. Valve V², is now closed and, the metals having been heated to the proper point, the valve L, is operated to connect the cylinder with the receiver R, in proper manner to give the piston and the work holder the desired end movement.

In Fig. 5, I have shown a pressure gage G, as connected to the inlet pipe O, between the source of pressure and the valve L. V, is the reducing valve through which the fluid passes to the four way cock. The reducing valve is placed between the main M, and the cylinder. By adjusting it, any sized stock may be provided for. The gage indicates the pressure in the cylinder.

In Fig. 6, I have shown a hand pump H, as employed for producing the desired pressure. The pump forces the fluid into the small receiver R, from which it passes to the four way cock and cylinder. Air is preferably employed as the fluid. During the whole operation of welding the operator may work the pump to produce the suitable pressure the gage indicating to him the pressure in the receiver and enabling him to keep it up to the desired point. It is obvious that a number of separate welding apparatus may be supplied from the same source or main M, and be worked independently of one another on different sizes or characters of work, the reducing and regulating valves enabling each operator to employ the pressure desired independently of the others.

In Fig. 7, is illustrated the application of my invention to both clamps. The back ends of the two cylinders are connected together and to one side of the four way valve, and the front ends connected to the other side of the valve. The inlet and outlet pipes are the same as in the previous figures, and the motion is controlled by the lever L. It is not even necessary to limit the construction to two sliding clamps, as four might be used at right angles in the forging of crossed pieces, &c. Of course, these cylinders are insulated from each other to prevent a shunting of the current. The same interposed arrangements could be used here if required.

Figure 8:
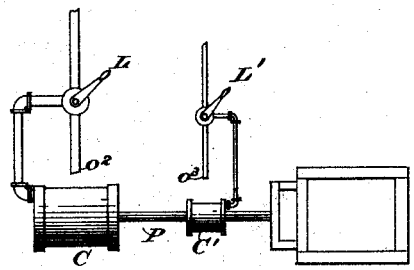

In Fig. 8, is shown a device consisting of two cylinders with pistons working on one rod. The small cylinder is used to bring the sliding clamp back, in order to separate the two, and the large one supplies the welding pressure. Each cylinder has pressure admitted to one end only, the large one in a direction to move the piston forward, and the small one to move it backward. It is not necessary in all cases to use fluid pressure to bring the clamps to a backward position; but such pressure may be used merely to do the metal working operation.

Figure 9:
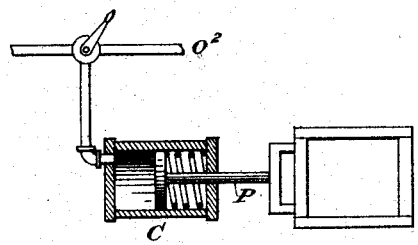

In Fig. 9, a spring is placed in one end of the cylinder to draw back the clamp while fluid pressure is used in the other end both to force the metals together and compress the spring.

When the machine is used in a vertical position, the spring may be dispensed with, and the weight of the piston and clamp itself, and perhaps a slight additional weight used to do the drawing back.

The outlet pipe is supposed to be connected with a drain; but I prefer to use the exhaust fluid, particularly if water, to cool the clamping arrangements, as exemplified in United States Letters Patent granted to me August 25, 1891, No. 458,176. This prevents an unnecessary waste of water, which occurs when the cooling fluid is derived from a separate source.

What I claim as my invention is—

1. The combination in an electric metal working apparatus, of a movable work holder, means for operating the same by pressure of air, gas, water or other fluid, and regulating or adjusting devices for determining the force or pressure applied to said work holder when the metal becomes softened by the electric current, as and for the purpose described.

2. In an electric metal working apparatus, the combination with a movable work holder, of means for operating the same by pressure of air, gas, water or other fluid, and regulating or adjusting devices for determining the pressure of fluid applied to the piston or other device which moves the work holder when the metal has become softened by the electric current.

3. In an electric metal working apparatus, the combination with the movable work holder, of a piston arranged in line therewith and with the opposite holder, a source of air, gas, water or other fluid under pressure, and means for indicating or adjusting the pressure applied to the piston so as to determine the force to which the heated metal shall be subjected when it has become softened by the electric current.

4. In an electric metal working apparatus, the combination substantially as described, of a work holder, a piston and cylinder, a source of air or other gas under pressure, and means for regulating or adjusting the pressure of such air or gas according to the nature of the work which is softened by the heating effect of the electric current.

5. The combination in an electric metal working apparatus, of movable work holders, means for moving the same under the pressure of air, gas or other fluid, a source of fluid under pressure, and an intermediate adjustable reducing valve.

6. In an electric metal working apparatus, the combination with the longitudinally movable work holder, of a cylinder, a piston therefor arranged to work in line with the work holder, a source of fluid pressure, and a four way valve and connections, substantially as and for the purpose described.

7. The combination in an electric metal working apparatus, of a work holder longitudinally movable toward and away from the opposite holder, a cylinder, a piston therefor for producing movements of such work holder, a four way valve, pipes and connections as described, and an adjustable reducing valve in the connections leading from the source of pressure.

8. The combination in an electric metal working apparatus, of two work holding clamps, a clamp operating piston for each, and cylinders connected with a controlling cock or valve common to such cylinders whereby the pistons may be moved simultaneously, as and for the purpose described.

Signed at Lynn, in the county of Essex and State of Massachusetts, this 21st day of June, A. D. 1890.

HERMANN LEMP.

Witnesses:
JOHN W. GIBBONEY,
AXEL EKSTRÖM.